United States Patent
Prociw et al.

(10) Patent No.: US 10,788,214 B2
(45) Date of Patent: Sep. 29, 2020

(54) FUEL INJECTORS FOR TURBOMACHINES HAVING INNER AIR SWIRLING

(71) Applicant: Delavan Inc., West Des Moines, IA (US)

(72) Inventors: Lev Alexander Prociw, Johnston, IA (US); Jason A. Ryon, Carlisle, IA (US); Gregory A. Zink, Des Moines, IA (US)

(73) Assignee: Delavan Inc., West Des Moines, IA (US)

(*) Notice: Subject to any disclaimer, the term of this patent is extended or adjusted under 35 U.S.C. 154(b) by 168 days.

(21) Appl. No.: 15/949,783

(22) Filed: Apr. 10, 2018

(65) Prior Publication Data

US 2019/0309949 A1    Oct. 10, 2019

(51) Int. Cl.
| | | |
|---|---|---|
| F23R 3/12 | (2006.01) | |
| F23R 3/28 | (2006.01) | |
| F02C 7/18 | (2006.01) | |
| F23R 3/14 | (2006.01) | |
| F23D 11/38 | (2006.01) | |
| F23D 14/24 | (2006.01) | |

(52) U.S. Cl.
CPC ............. *F23R 3/283* (2013.01); *F02C 7/18* (2013.01); *F23D 11/383* (2013.01); *F23D 14/24* (2013.01); *F23R 3/12* (2013.01); *F23R 3/14* (2013.01); *F23R 3/286* (2013.01); *F23C 2900/07001* (2013.01); *F23D 2202/00* (2013.01); *F23D 2206/10* (2013.01); *F23D 2900/14021* (2013.01)

(58) Field of Classification Search
CPC .... F23R 3/286; F23R 3/30; F23R 3/32; F23R 3/12; F23R 3/14; F23D 2900/14021; F23D 11/383; F23D 14/24; F23C 2900/07001
See application file for complete search history.

(56) References Cited

U.S. PATENT DOCUMENTS

| | | | | |
|---|---|---|---|---|
| 2,870,632 A | * | 1/1959 | Gaubatz | F01D 17/08 |
| | | | | 73/861.68 |
| 3,638,865 A | * | 2/1972 | McEneny | F23D 11/26 |
| | | | | 239/424 |
| 3,831,854 A | * | 8/1974 | Sato | F23D 11/00 |
| | | | | 239/406 |

(Continued)

FOREIGN PATENT DOCUMENTS

| | | |
|---|---|---|
| EP | 1199522 A2 | 4/2002 |
| EP | 2500641 A1 | 9/2012 |

(Continued)

OTHER PUBLICATIONS

Extended European search report issued in corresponding EP patent application No. 19167644.4 dated Jul. 26, 2019.

*Primary Examiner* — Gerald L Sung
*Assistant Examiner* — Marc J Amar
(74) *Attorney, Agent, or Firm* — Locke Lord LLP; Daniel J. Fiorello; Scott D. Wofsy

(57) ABSTRACT

A fuel injector for a turbomachine includes an inner heat shield having an air cavity wall defining an air cavity for allowing air to flow therethrough. The inner heat shield includes an integral air swirler forming a downstream end thereof. The integral air swirler extends in an axially downstream direction at least as far as a fuel distribution channel defined on or in a fuel distributor of the injector to direct airflow at an outlet of the fuel distributor.

10 Claims, 3 Drawing Sheets

(56) References Cited

U.S. PATENT DOCUMENTS

| | | | | |
|---|---|---|---|---|
| 4,470,262 | A * | 9/1984 | Shekleton | F02C 7/2365 60/737 |
| 4,609,150 | A * | 9/1986 | Pane, Jr. | F23C 7/004 239/397.5 |
| 5,197,290 | A * | 3/1993 | Lee | F23R 3/14 137/855 |
| 8,348,180 | B2 * | 1/2013 | Mao | F23R 3/14 239/403 |
| 2004/0061001 | A1 * | 4/2004 | Mao | F23D 11/108 239/398 |
| 2004/0112061 | A1 * | 6/2004 | Oskooei | F23R 3/283 60/776 |
| 2009/0049838 | A1 * | 2/2009 | Oskin | F23R 3/14 60/734 |
| 2009/0277176 | A1 | 11/2009 | Caples | |
| 2014/0245742 | A1 * | 9/2014 | Chew | F23R 3/14 60/748 |
| 2014/0246518 | A1 * | 9/2014 | Myers | F23R 3/14 239/406 |
| 2014/0339339 | A1 * | 11/2014 | Prociw | F23R 3/28 239/406 |
| 2016/0312708 | A1 * | 10/2016 | Chen | F23R 3/14 |
| 2017/0108223 | A1 | 4/2017 | Ryon et al. | |
| 2018/0079688 | A1 * | 3/2018 | Kirby | C04B 41/52 |
| 2018/0259183 | A1 * | 9/2018 | Fetvedt | F23G 5/027 |
| 2019/0071363 | A1 * | 3/2019 | Li | C04B 35/80 |

FOREIGN PATENT DOCUMENTS

| | | | |
|---|---|---|---|
| EP | 2589866 | A2 | 5/2013 |
| EP | 2775202 | A2 | 9/2014 |

* cited by examiner

FUEL INJECTORS FOR TURBOMACHINES HAVING INNER AIR SWIRLING

BACKGROUND

1. Field

The present disclosure relates to turbomachines, more specifically to fuel injector systems for turbomachines.

2. Description of Related Art

A conventional fuel nozzle air swirler is comprised of a separate air swirler and heat shield element. These parts of traditional injectors are difficult to attach and may experience inadvertent release of the swirler which can affect performance. Such conventional methods and systems have generally been considered satisfactory for their intended purpose. However, there is still a need in the art for improved fuel nozzle/injector systems. The present disclosure provides a solution for this need.

SUMMARY

A fuel injector for a turbomachine includes an inner heat shield having an air cavity wall defining an air cavity for allowing air to flow therethrough. The inner heat shield includes an integral air swirler forming a downstream end thereof. The integral air swirler extends in an axially downstream direction at least as far as a fuel distribution channel defined on or in a fuel distributor of the injector to direct airflow at an outlet of the fuel distributor.

The integral air swirler can include an angled or curved wall extending from the downstream end of the heat shield such that the angled or curved wall extends both axially downstream and radially inward. The angled or curved wall can have a frustoconical shape having a linear inner or outer surface and/or curved inner or outer surface. The angled or curved wall can include a plurality of swirling channels defined therethrough and configured to effuse swirling air.

The air swirler can include an upstream extending wall that extends from a downstream end of the angled or curved wall in the axially upstream direction. The upstream extending wall extends both axially upstream and radially inward. The upstream extending wall includes a conical or frustoconical shape.

The upstream extending wall can include one or more inner swirling holes configured to effuse swirling air. The upstream extending wall can extend axially upstream beyond the angled or curved wall and into a constant inner diameter area of the heat shield. An outer surface of the heat shield can include an engagement protrusion axially upstream from the air swirler and configured to engage with the fuel distributor to seat the air swirler proximate an outlet of the fuel distributor.

In accordance with at least one aspect of this disclosure, an inner heat shield for a fuel injector of a turbomachine can include an air cavity wall defining an air cavity for allowing air to flow therethrough, wherein the inner heat shield includes an integral air swirler forming a downstream end thereof, wherein the air cavity wall and/or the integral air swirler are configured to extend in an axially downstream direction at least as far as a fuel distribution channel defined on or in a fuel distributor of the injector to direct airflow at an outlet of the fuel distributor. The inner heat shield can include any suitable configuration as disclosed above and/or below.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
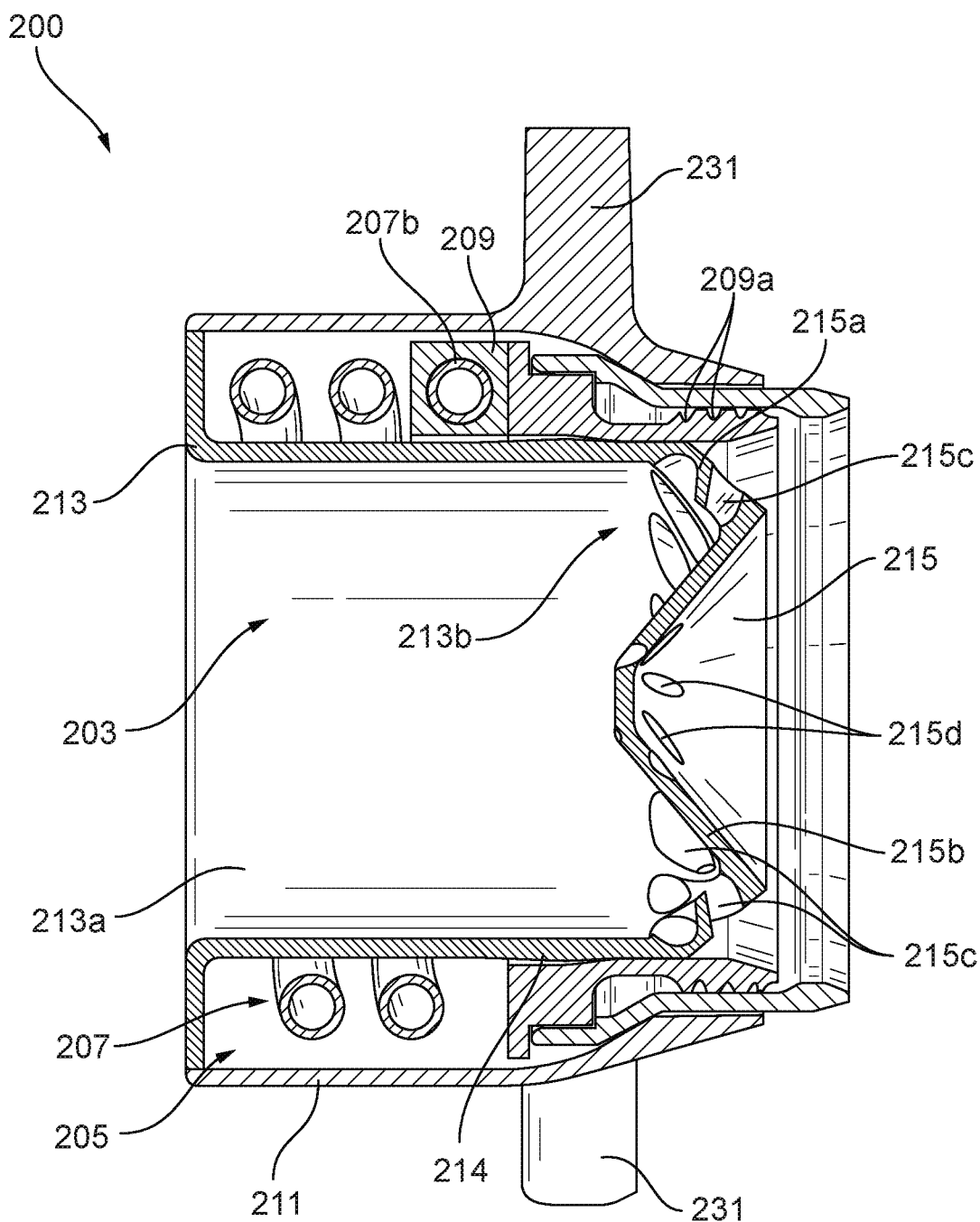
FIG. 1 is a cross-sectional view of an embodiment of a fuel injector/nozzle in accordance with this disclosure.

Reference will now be made to the drawings wherein like reference numerals identify similar structural features or aspects of the subject disclosure. For purposes of explanation and illustration, and not limitation, an illustrative view of an embodiment of a fuel injector (which can also be referred to as a fuel nozzle) in accordance with the disclosure is shown in FIG. 1 and is designated generally by reference character 200. Other embodiments and/or aspects of this disclosure are shown in FIGS. 2-3.

Figure 2:
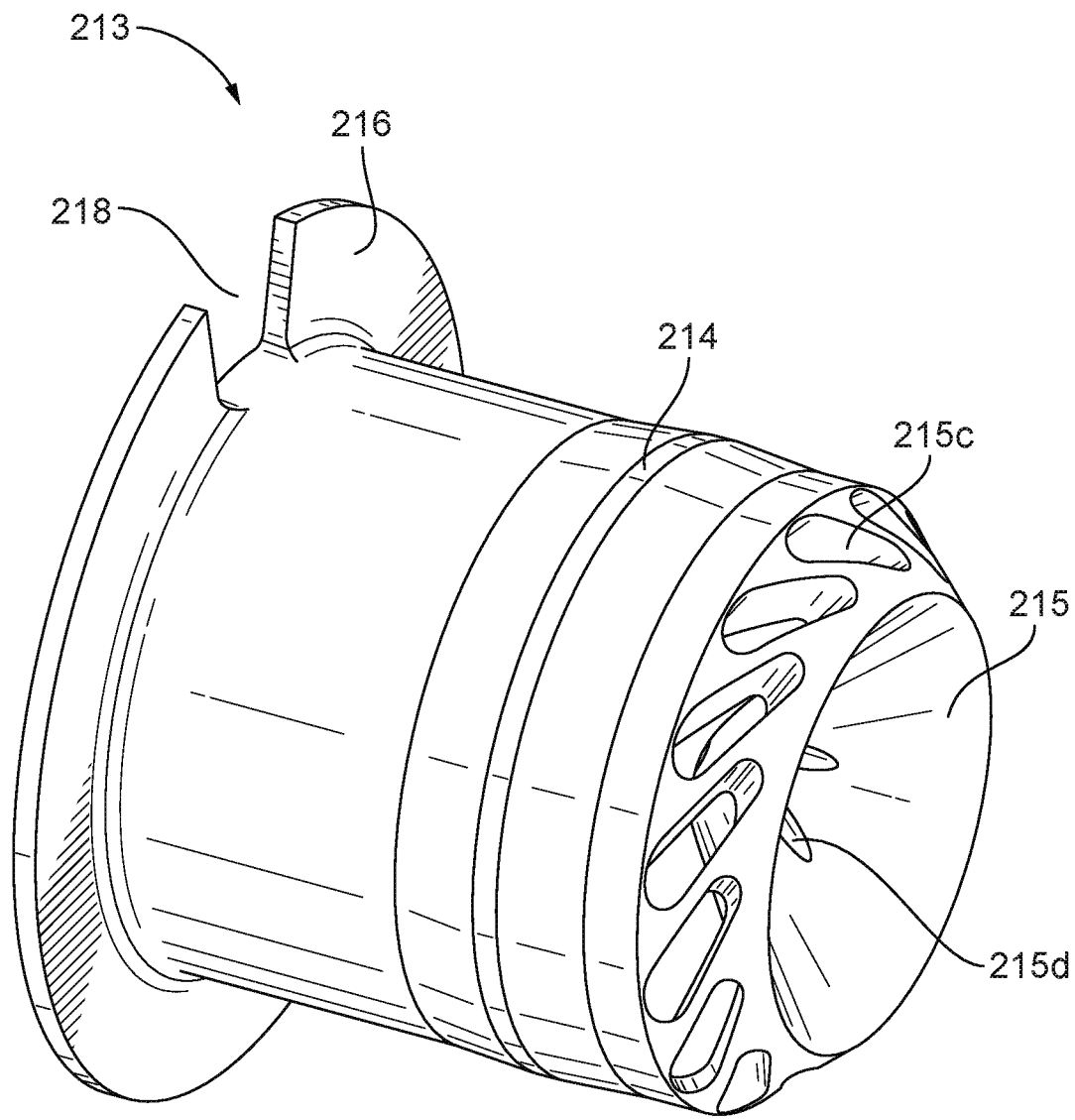
FIG. 2 is a perspective view of an embodiment of an inner heat shield in accordance with this disclosure, e.g., as used in the embodiment of FIG. 1.
Figure 3:
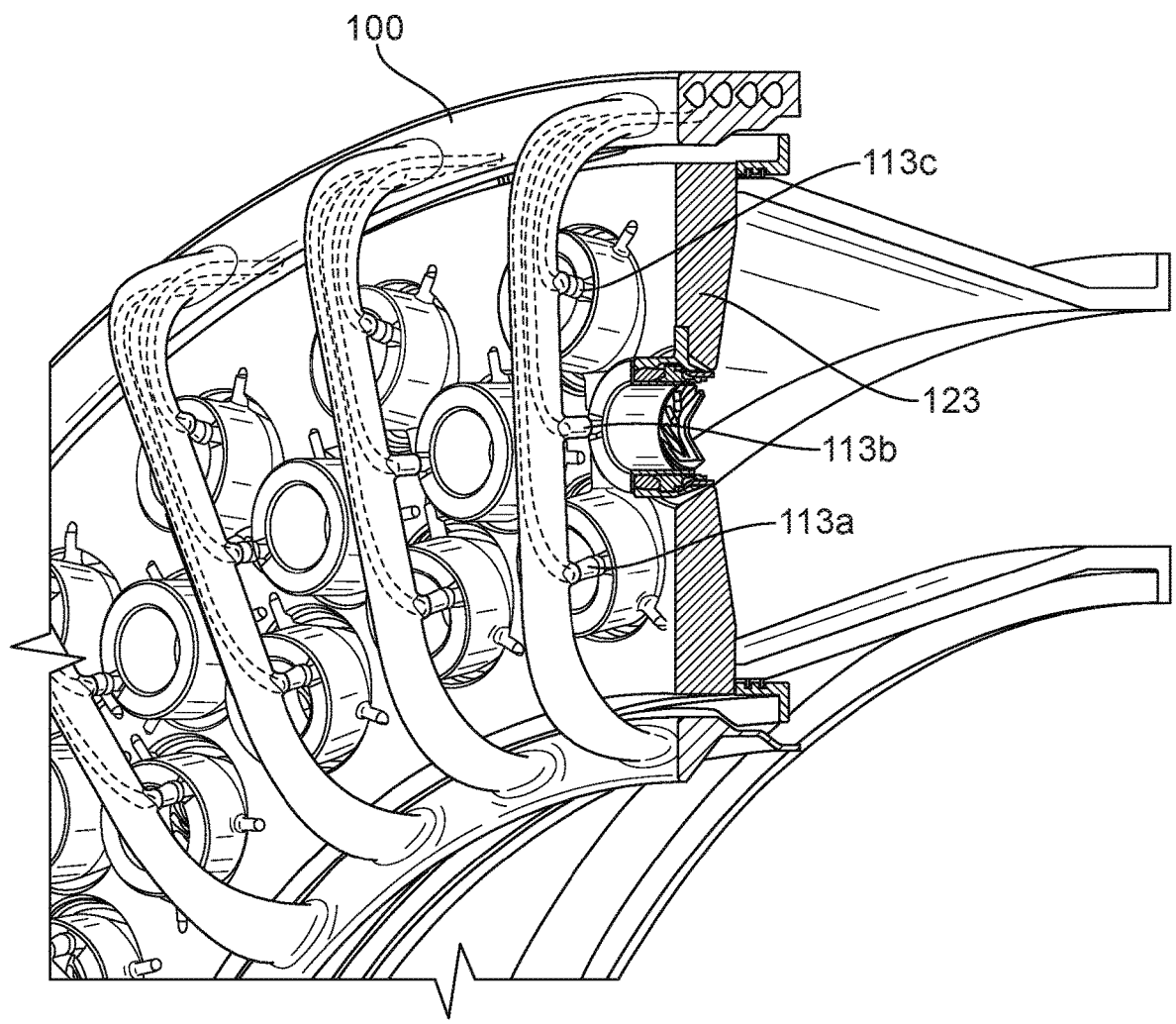
FIG. 3 is a partial perspective cutaway view of an embodiment of a multipoint injection/combustor system in accordance with this disclosure.

Referring to FIGS. 1 and 2, a fuel injector 200 for a turbomachine includes an inner heat shield 213 having an air cavity wall 213a defining an air cavity 203 for allowing air to flow therethrough. The inner heat shield 213 includes an integral air swirler 215 forming a downstream end 213b of the heat shield 213 as shown. The fuel injector 200 can include an outer heat shield 211 and a fuel distributor 209.

The integral air swirler 215 can extend in an axially downstream direction at least as far as a fuel distribution channel 209a defined on or in a fuel distributor 209 of the injector 200 to direct airflow at an outlet of the fuel distributor 209. For example, the fuel distributor 209 can include one or more fuel distribution channels 209 that are defined circumferentially about the fuel distributor to distribute fuel about the circumference of the fuel distributor 209. As shown, the air cavity wall 213a and/or the integral air swirler 215 are configured to extend at least as axially downstream as the one or more of the fuel distribution channels 209a of the fuel distributor 209 of the injector 200 when installed in the outer heat shield 211.

The integral air swirler 215 can include an angled or curved wall 215a extending from the downstream end of the heat shield 213 such that the angled or curved wall 215a extends both axially downstream and radially inward. The angled or curved wall 215a can include any suitable shape that extends axially downstream and radially inward. For example, as shown, the angled or curved wall 215a can include a frustoconical shape having a linear inner or outer surface and/or curved inner or outer surface. For example, inner and/or outer surfaces of the angled or curved wall 215 can be linear such that a portion of a cone is formed. In other embodiments, the inner and/or outer surface of the angled or curved wall 215 can be curved such that a portion of a spherical shape is formed. In other suitable shapes are contemplated herein.

The angled or curved wall 215a can include a plurality of swirling channels 215c defined therethrough and configured to effuse swirling air. In certain embodiments, the swirling channels 215c are shaped to direct air tangentially, at least partially radially outward, and at least partially axially downstream as shown (e.g., aimed at an expanding section and/or outlet of the fuel distributor 209 to mix with fuel effusing from the fuel distribution channels 209).

The air swirler 215 can include an upstream extending wall 215b that extends from a downstream end of the angled or curved wall 215a in axially upstream direction. The upstream extending wall 215b can extend both axially upstream and radially inward as shown (e.g., such that it reverses direction). The upstream extending wall 215b can include a conical or frustoconical shape as shown.

The upstream extending wall 215b can include one or more inner swirling holes 215d configured to effuse swirling air. The inner swirling holes 215d can be configured to aim air at a further downstream location than the swirling channels 215c. In certain embodiments, the swirling channels 215c and/or swirling holes can include shaped slots and/or round holes, and/or rectangular slots. Any other suitable configuration to effuse and/or swirl air for the inner swirling holes 215d and/or swirling channels 215c is contemplated herein.

The upstream extending wall 215b can extend axially upstream beyond the angled or curved wall and into a constant inner diameter area of the inner heat shield 213 as shown. In certain embodiments, the upstream extending wall 215b is configured to act as a flow guide and/or reducer that directs airflow (e.g., and/or speeds up airflow) from the air cavity 203 to the swirling channels 215c.

In certain embodiments, the inner heat shield 213 can include a constant diameter inner diameter surface (e.g., cylindrical in shape) for the air cavity wall 213a. In certain embodiments, an outer surface 213b of the heat shield 213 can include an engagement protrusion 214 axially upstream from the air swirler 215 and configured to engage with the fuel distributor 209 (e.g., an inner diameter of the fuel distributor 209 as shown) to seat the air swirler 215 proximate an outlet of the fuel distributor 209.

The fuel injector 200 can be configured for us with a multipoint injection system (e.g., as shown in FIG. 3) or any other suitable system. The fuel injector 200 can include an interior cavity 205 defined between the inner heat shield 213 and the outer hear shield 211. A fuel tube 207 can be disposed at least partially within the interior cavity 205 of the body 201.

As shown in FIG. 2, the inner heat shield 213 can include a seating flange 216 for seating the inner heat shield 213 within the outer heat shield 211. The seating flange 216 can include a fuel tube opening 218 for allowing one or more of a fuel tube end and/or a fuel tube connector (e.g., including an elbow) of a fuel manifold to pass through the flange 216 to connect the fuel tube 207, Referring additionally to FIG. 3, the fuel tube 207 can include a first end (not shown) configured to connect to a fuel injector connector (e.g., 113a, 113b, 113c) of a fuel manifold (e.g., manifold 100). In certain embodiments, the first end can include an elbow (not shown) configured to mate with a fuel injector connector (e.g., 113a, 113b, 113c).

As shown in Fig. 1, the fuel tube 207 can include a second end 207b configured to connect to a fuel distributor 209 of the fuel injector 200. The fuel injector 200 can be configured to be disposed at least partially in a combustor dome (e.g., combustor dome 123). The fuel tube can be configured to move in an axial direction (e.g., a centerline of the fuel injector 200) to allow flexibility between the fuel manifold (e.g., manifold 100) and the combustor dome (e.g., combustor dome 123).

The fuel tube 207 can be a coiled fuel tube 207. The coiled fuel tube 207 can be configured to axially compress and/or expand between the first end and the second end 207b (e.g., like a spring). As shown, the coiled tube 207 can be contained within the interior cavity 205 of the fuel injector 200.

In certain embodiments, the outer heat shield 211 and the inner heat shield 213 can be integrally formed together (e.g., via additive manufacturing). In certain embodiments, the outer heat shield 211 and the inner heat shield 213 can be separate components. In certain embodiments, the air swirler 215 can be a separate component from the air cavity wall 213a and can be attached together in any suitable manner (e.g., brazing, bonding, clipping, etc.). In certain embodiments, the inner heat shield 213 can be integrally formed to have the air swirler 215 thereon (e.g., via casting, via additive manufacturing). The inner heat shield can be made from any suitable material (e.g., preferably low alpha, low conductivity material such as ceramic matrix composite).

The interior cavity 205 can be formed between the outer heat shield 211 and the inner heat shield 213 such that the coiled fuel tube 207 is disposed between the outer heat shield 211 and the inner heat shield 213. The outer heat shield 211 can include one or more standoff features 231 for orienting the fuel injector 200 on the combustor dome (e.g., to align with a fuel injector connector 113a, 113b, 113c of a fuel manifold 100). The one or more standoff features 231 can include three standoff features, for example. The fuel distributor 209 can be disposed at least partially within the interior cavity 205 defined between the outer heat shield 211 and the inner heat shield 213.

Embodiments reduce part count and thereby reduce cost. In embodiments, inner air from the air cavity allows energizing of the fuel to produce a very thin circumferential film on a relatively large diameter, e.g., about 50% of the total nozzle exit enters through the inner air cavity. The inner air and fuel can then vigorously mix with converging outer air flow (that passes around the outer heat shield 211 through the combustor dome 123) to produce near premixed (e.g., ideal) conditions. The mixture can be burned immediately downstream of the nozzle/injector in a lean burn fashion (e.g., which can have low emissions).

The large amount of core air, the relatively high pressure drop and high temperature can transmit a substantial amount of unwanted heat to the fuel distributor, however, the core heat shield reduces the convective heat transfer. Certain embodiments eliminate risk of detachment of the air swirler because it is integral with heat shield. Embodiments can also cause radial divergence and swirl at the same time which can improve mixing and efficiency.

Embodiments direct air swirling at the outlet such that air is energetically directed radially outwards toward the fuel lip but with substantial tangential velocity component to encourage circumferential uniformity and subsequent mixing with the outer air stream. Embodiments extend axially from a cylindrical heat shield and provide a heat shield all the way in the axial direction of fuel components. Substantial tangential velocity is retained to encourage mixing with the convergent, e.g., unswirling, outer air stream. Embodiments permit a substantial amount of air to enter through the inner channel since the features can be on a relatively large diameter.

Any suitable combination(s) of any disclosed embodiments and/or any suitable portion(s) thereof is contemplated therein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fuel injector for a turbomachine, comprising:
an inner heat shield having an aft cavity wall defining an air cavity for allowing air to flow therethrough, wherein the inner heat shield includes an integral air swirler forming a downstream end of the heat shield, wherein the integral aft swirler extends in an axially downstream direction at least as tar as a fuel distribution channel defined on or in a fuel distributor of the injector to direct airflow at an outlet of the fuel distributor,
wherein the integral aft swirler includes an angled or curved wall extending from a downstream end of the air cavity wall such that the angled or curved wall extends both axially downstream, and radially inward until a downstream end of the angled or curved wall, wherein the angled or curved wall includes a plurality of swirling channels defined therethrough and configured to effuse swirling air, wherein the air swirler includes an upstream extending wall that extends from the downstream end of the angled or curved wall in an axially upstream direction, wherein the upstream extending wall extends both axially upstream and radially inward.

2. The fuel injector of claim 1, wherein the upstream extending wall includes one or more inner swirling holes configured to effuse swirling air.

3. The fuel injector of claim 1, wherein the upstream extending wall includes a conical or frustoconical shape.

4. The fuel injector of claim 1, wherein the upstream extending wall extends axially upstream beyond the angled or curved wall and into a constant inner diameter area of the heat shield.

5. The fuel injector of claim 4, wherein an outer surface of the heat shield includes an engagement protrusion axially upstream from the air swirler and configured to engage with the fuel distributor to seat the air swirler proximate an outlet of the fuel distributor.

6. An inner heat shield for a fuel injector of a turbomachine, comprising:
an air cavity wall defining an air cavity for allowing air to flow therethrough, wherein the inner heat shied includes an integral air swirler forming a downstream end thereof, wherein the aft cavity wall and/or the integral aft swirler extend in an axially downstream direction at least as far as a fuel distribution channel defined on or in a fuel distributor of the injector to direct airflow at an outlet of the fuel distributor,
wherein the integral aft swirler includes an angled or curved wall extending from a downstream end of the air cavity wall such that the angled or curved wall extends both axially downstream, and radially inward unto a downstream end of the angled or curved wall, wherein the angled or curved wall includes a plurality of swirling channels defined therethrough and configured to effuse swirling air, wherein the air swirler includes an upstream extending wall that extends from the downstream end of the angled or curved wall in an axially upstream direction, wherein the upstream extending wall extends both axially upstream and radially inward.

7. The heat shield of claim 6, wherein the upstream extending wall includes one or more inner swirling holes configured to effuse swirling air.

8. The heat shield of claim 6, wherein the upstream extending wall includes a conical or frustoconical shape.

9. The heat shield of claim 6, wherein the upstream extending wall extends axially upstream beyond the angled or curved wall and into a constant inner diameter area of the heat shield.

10. The heat shield of claim 9, wherein an outer surface of the heat shield includes an engagement protrusion axially upstream from the air swirler and configured to engage with the fuel distributor to seat the air swirler proximate an outlet of the fuel distributor.

* * * * *